March 21, 1961 G. B. SHIELDS 2,975,672

COMBINED TAPE RECORDER AND FILM PROJECTOR

Filed July 21, 1954

2 Sheets-Sheet 1

INVENTOR.
George B. Shields
BY
Mason, Kolehmainen, Rathburn + Wyss
Attys.

March 21, 1961 G. B. SHIELDS 2,975,672

COMBINED TAPE RECORDER AND FILM PROJECTOR

Filed July 21, 1954 2 Sheets-Sheet 2

INVENTOR.
George B. Shields
BY
Mason, Kolehmainen, Rathburn & Wyss
Attys.

United States Patent Office
2,975,672
Patented Mar. 21, 1961

2,975,672

COMBINED TAPE RECORDER AND FILM PROJECTOR

George B. Shields, Racine, Wis., assignor to Webster Electric Company, Racine, Wis., a corporation of Delaware Filed July 21, 1954, Ser. No. 444,805
17 Claims. (Cl. 88—28)

Figure 1:
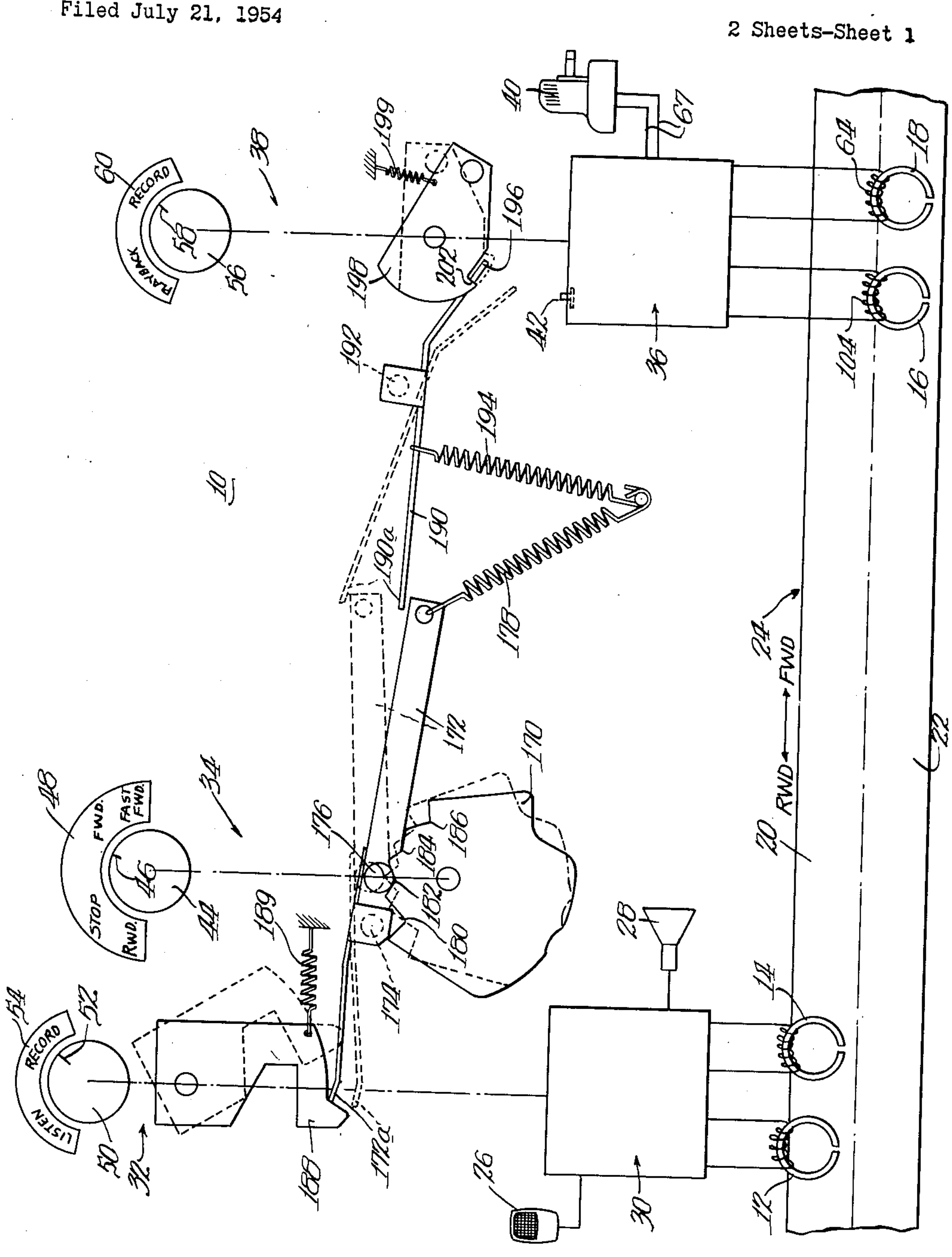

This invention relates to a combination sound and visual display apparatus and, more particularly, to a combined tape recorder and film projector.

One object of the present invention is to provide a new and improved apparatus for providing sound synchronized with successive visual displays.

Another object is to provide an apparatus for conjointly recording both control signals and intelligence signals on a sensible medium in conjunction with the operation of a visual display device.

A still further object involves the provision of a magnetic tape recorder including means for both recording control signals on and reproducing control signals from a magnetic tape in conjunction with the operation of a display device including means for intermittently advancing successive frames of film into a display position.

Another object of the present invention is to provide a magnetic recorder having new and improved means for simultaneously reproducing or recording different types of signals on a plurality of channels of a magnetic medium.

Another object is to provide transducing apparatus including new and improved means for controlling the circuit connections to a plurality of simultaneously effective transducing means.

Another object is to provide new and improved means for interlocking the controls which select the nature of the transducing operation to be performed by a plurality of transducing means.

A still further object is to provide means for interlocking the operation of means for moving a sensible medium relative to a pluraity of transducing means with the controls for each transducing means.

In accordance with these and many other objects, one embodiment of the invention compirses a conventional tape recorder including tape impelling and guiding means for moving successive increments of a magnetic media past two separate transducing heads, each having an erasing head associated therewith. Conventional circuit means are associated with the first transducing means whereby this head can be selectively rendered effective under the control of a manually adjustable means for either recording information on or reproducing information from a single channel of a plural channel tape. The second transducing head is provided with circuit means whereby control indicia can be recorded on a second channel of the tape in response to the selective operation of manual control means associated with the tape recorder. The manually operable means also control an operating unit associated with a film projector so that successive frames on a film are moved into a projecting position simultaneously with the recording of control indicia on the second or control channel of the tape.

A circuit associated with the second transducing head also includes means for conditioning the circuit for a playback operation in which the previously recorded information on the control channel is detected and subsequently applied to the operating unit for the slide projector so that successive frames of the film are moved into a projecting position in synchronism with the reproduction of the conventional intelligence recorded on the first channel of the tape. The improved magnetic recorder and slide display apparatus also includes means for interlocking the independent listen-record controls associated with the transducing heads and their associated erasing heads with manually operated means for controlling the movement of the tape so that it is impossible to inadvertently erase either the recorded intelligence on the first channel of the tape or the control indicia on the second channel of the tape.

Figure 2:
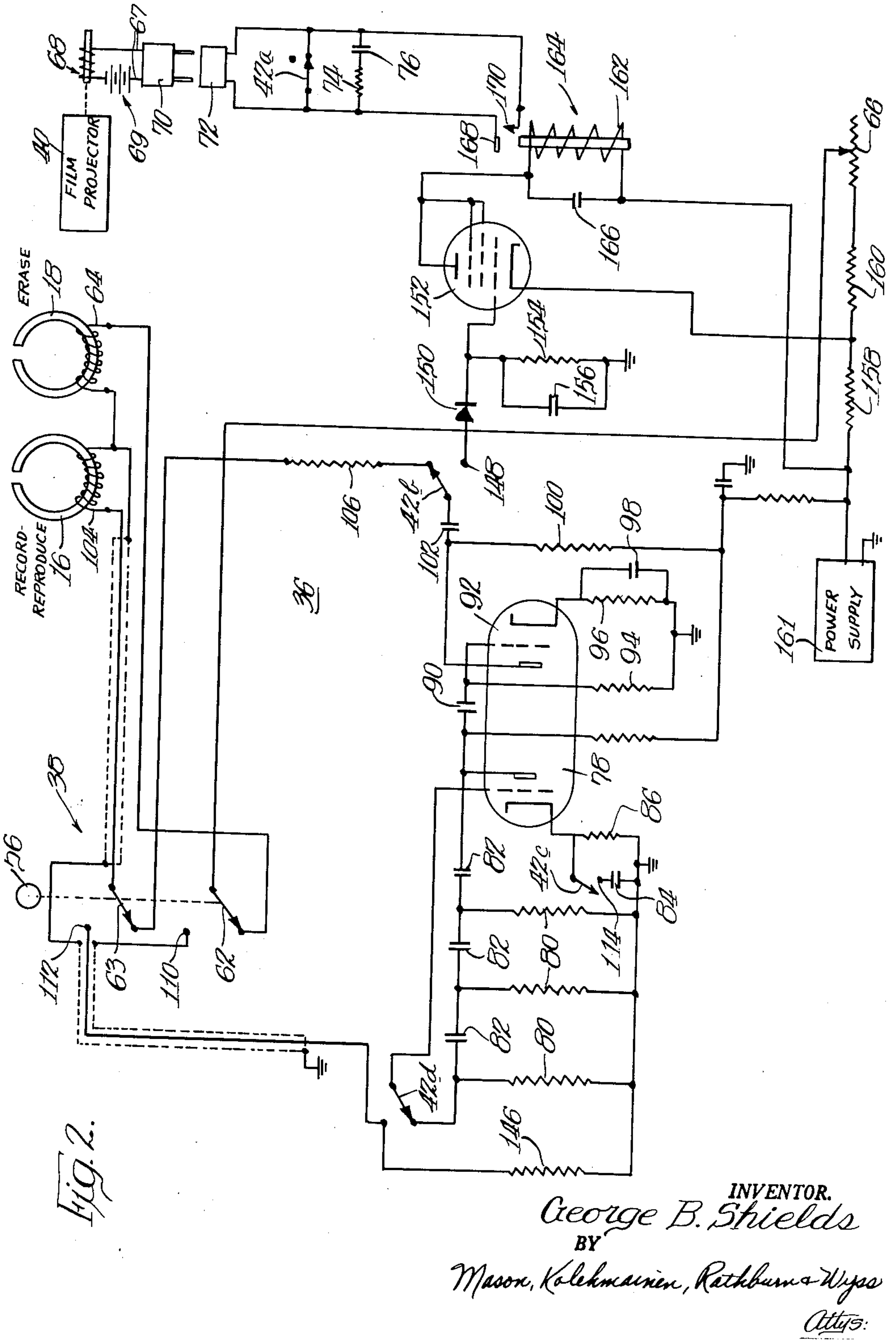

Many other objects and advantages of the present invention will become evident from a study of the following description when taken in conjunction with the drawings wherein:

Fig. 1 is a digrammatic view of a combined magnetic tape recorder and film projector embodying the present invention and illustrating particularly the interlock between the manually operable means controlling the movement of a magnetic tape and effectiveness of the transducing heads; and Fig. 2 is a schematic view of the record-reproduce control circuit associated with the control indicia transducing means showing the manner in which this circuit controls the operation of a film projector.

Referring now to Fig. 1, there is illustrated diagrammatically a combined tape recorder and film projector apparatus indicated as a whole by reference character 10. It includes four transducing means 12, 14, 16, and 18 arranged for cooperation with laterally spaced channels 20 and 22 on a magnetic tape 24. Of the transducing means, the means 12 and 14 are record-reproduce and erase means for one channel 20 and means 16 and 18 are similar means for the second channel 22.

The transducer means 12 and 14 are associated with a microphone 26 and a loudspeaker 28 and tape recorder-reproducer apparatus indicated as a whole by reference character 30. This apparatus may be of known type or like the apparatus disclosed in my copending application, Serial No. 438,655, filed June 23, 1954, entitled Recorder-Reproducer Apparatus, assigned to the assignee of this application and includes a pair of manually operable controls or control units 32 and 34 for controlling certain operations of the apparatus. The unit 32 controls the recording and reproducing operations while the unit 34 controls the operation of the tape impelling and guiding means.

In accordance with a feature of the present invention, the apparatus 10 includes also a second tape recorder-reproducer apparatus correlated with the first providing an advantageous type of control for a projector. The second recorder-reproducer apparatus is indicated by the reference character 36. In Fig. 1 it is shown as being separate from the apparatus 30 but actually the two may readily be built as a completely self contained and portable unit constituting the apparatus 10. The control apparatus 36 has associated with it a first manually operable control unit 38 for conditioning it for recording control signals or reproducing the signals for application to a projector 40, which may be any automatic slide or strip film projector. The apparatus 36 includes also a manually operable control element 42 for applying a control signal to the tape when control unit 38 conditions the apparatus for recording.

Returning now to the tape recorder-reproducer apparatus 30, its manually operable multi-position control unit 34 controls the speeds and directions of movement of the tape past the four transducers 12, 14, 16, and 18. This control, which may well be considered a main control, includes a knob 44 having an index mark 46 thereon which cooperates with indicia on a faceplate 48 to indicate the position to which the main control assembly 34 is adjusted. The control 34 may be adjusted to a stop position in which the tape driving means is rendered ineffective so that there is no movement of the magnetic tape 24; a forward (FWD) position in which the tape is advanced from a supply reel to a takeup reel at a normal speed for transducing operations; a fast forward (FAST FWD) position in which the tape is moved at a high speed from the supply reel to the takeup reel; and a rewind (RWD) position in which the tape is returned from the takeup reel to the supply reel at a high rate of speed. As indicated heretofore, the tape driving means have not been illustrated but may be of the type disclosed in my copending application.

The record-reproduce control unit 32 is manually operable selectively to condition recorder-reproducer apparatus 30 for recording and reproducing or listening. It comprises a knob 50 having an index mark 52 cooperating with the indicia (RECORD-LISTEN) on a faceplate 54. In the record position, the microphone 26 is connected to head 12 and the erase head to a source of high frequency erase current which is used to erase the audio signal channel 20. In the reproduce or listen position the loudspeaker 28 is connected to the head 12.

Generally, when it is desired to prepare the magnetic tape 24 for reproducing sound in conjunction with operation of the slide projector 40, the main control 34 is adjusted to the forward position and the control 32 is adjusted to connect the record head 12 with the microphone 26 and to connect the erase head 14 to a source of erase current, while the speaker 28 is either not used or used for monitoring. The microphone 26 serves to record the desired audible information on the intelligence channel 20 of the tape. At the intervals when the slide projector 40 is to be actuated to advance another frame of a film into a projecting position, the push button 42 is manually operated to momentarily energize the transducing head 16 thereby to record a control signal on the channel 22 of the tape 24. Simultaneously with energizing the transducing head 16, contacts controlled by the push button 42 complete an energizing circuit for operating means associated with the slide projector 40 to effect movement of a frame of a film strip or a mounted film slide into a projecting position. Following the release of the push button 42, the energizing circuit for both the transducing head 16 and the operating unit for the projector 40 are opened. During the recording operations, both of the erasing heads 14 and 18 are energized to remove previously recorded signals from the channels 20 and 22.

When it is desired to playback or reproduce the magnetic tape 24, the main control 34 is adjusted to the forward position and the control units 32 and 38 are moved to the listen and playback positions respectively. In these positions, the erase heads 14 and 18 are rendered ineffective and the transducing head 12 is connected with the loud speaker 28 through suitable amplifying means in the tape recorder 30 so that the information recorded on the intelligence channel 20 of the tape 24 is reproduced. Also, the transducing head 16 is connected through apparatus 36 to the operating unit for the projector 40 so that, in response to the detection of each control pulse on the channel 22 of the tape 24, the slide projector 40 is operated to advance a frame of film into a projecting position in synchronism with the sound being reproduced from the channel 20.

Referring now to Fig. 2 of the drawings, therein is disclosed the recorder-reproducer apparatus 36 which is used selectively to record control information on and to reproduce control information from the channel 22 of the magnetic tape 24. To record control signals on the control channel 22, a knob 56 (Figs. 1 and 2) forming part of the control unit 38 and having an index 58 thereon is adjusted to the record position as shown in Figs. 1 and 2 of the drawings. In this position, a switch arm 62 of the control unit connects the winding 64 of erase head 18 with a source of positive D.C. potential through a potentiometer 66 so that the control signal channel 22 of the magnetic tape 24 is erased by a direct current signal prior to the recording of control information. A second switch arm 63 of the control unit 38 conditions the transducing head 16 for control signal recording operations under the control of the push button 42.

In order to advance a film frame into a projecting position in synchronism with the sound being recorded on the channel 20, the push button 42 is depressed so that a plurality of switch arms 42*a*, 42*b*, 42*c*, and 42*d* associated therewith are moved to the signal recording position disclosed in Fig. 2 of the drawings. In this position, the switch arm 42*a* completes an energizing circuit 67, including a battery 69, for an operating device for the film projector 40 which is shown as being a solenoid 68, although it could be any other suitable control device which is capable of being actuated either by the mechanical movement produced by depression of the push button 42 or by a variation in the flow of an electrical current. Since the projector 40 may be remote from apparatus 36, the solenoid 68 is interconnected therewith by means of a plug 70 and a receptacle 72. A resistor 74 and a condenser 76 are connected across the switch arm 42*a* and the contact engaged thereby.

In order to provide means for recording a control signal on the channel 22 simultaneously with the operation of the film projector 40, the movement of the switch arm 42*d* to its operated position connects the grid of an electronic tube 78 to its plate through a phase shifting network comprising a plurality of resistors 80 and condensers 82, thereby forming a phase shift oscillator having a substantially sinusoidal output voltage. The switch arm 42*c* removes the bypass condenser 84 shunted around a resistance 86 in the cathode circuit of the tube 78 to produce degeneration for helping to maintain the tube 78 in oscillation. The circuit constants associated with the tube 78 are so chosen that the frequency of oscillation is approximately a thousand cycles per second, although any other suitable frequency could be used.

The output voltage from the tube 78 is coupled through a condenser 90 to the grid of an amplifier tube 92 having a grid resistor 94, a cathode resistor 96, a plate resistor 100, and a cathode bypass condenser 98. The amplified one thousand c.p.s. signal provided at the plate of the amplifier tube 92 is applied to a record head winding 104 through a coupling condenser 102, the operated switch arm 42*b*, a series resistance 106, and the switch arm 63. Accordingly, operation of the push button 42 simultaneously operates the film projector 40 and applies a signal to the transducing head 16 which is recorded on the control channel 22 of the tape 24.

Following the preparation of the magnetic tape 24 wherein intelligence is recorded on the channel 20 and one or more control discrete control signals are recorded on the control channel 22, the apparatus 36 is conditioned for a playback operation by rotating the knob 56 to the playback position. In this position, the switch arms 62 and 63 engage the contacts 110 and 112, respectively. The engagement of switch arm 62 with contact 110 disconnects the operating winding 64 of the erase head 18 from the potentiometer 66 and connects this potentiometer to ground so that information on the control channel 22 cannot be erased. The engagement of switch arm 63 with contact 112 connects the record-reproduce head 16 with the tube 78 which is utilized as an amplifier during playback for amplifying the reproduced control signals so that they will operate solenoid 68. More particularly, the winding 104 of head 16 is connected to the grid of the tube 78 through a circuit including the switch arm 63, the contact 112, and the switch arm 42*d* in its normal position. In this position, the switch arm 42*c* engages a contact 114 so that the bypass condenser 84 is shunted across the cathode resistor 86 of the tube 78. Also, by virtue of the fact that the switch arm 42*d* is in its normal position, the phase shifting network including the resistors 80 and the condensers 82 is effectively disconnected from the tube 78 and a resistor 146 is connected to the grid of the tube 78 to act as a grid resistor. Accordingly, when a control signal on the tape 24 is moved past the transducing head 16, a voltage is induced in the winding 104 which is applied to the grid of the tube 78.

Since the tube 78 and the circuit associated therewith provide a conventional amplifier, the voltage induced in the winding 104 is amplified in the tube 78. The amplified signal is supplied through the coupling condenser 90 to amplifier tube 92. The further amplified signal is applied through the coupling condenser 102 and the switch blade 42*b* to a rectifier 150. The polarity of the rectifier 150 is such that the positive portions of the amplified voltage are applied to a control grid of a tube 152 having an RC circuit including a resistor 154 and a condenser 156 associated therewith. During the positive portions of the signal applied to the rectifier 150, the condenser 156 is charged and, during the negative portions of the cycle, the condenser 156 discharges through the resistor 154 thereby providing a relatively constant positive bias on the grid of the tube 152 for the duration of the control signal. The cathode of the tube 152 is held at a positive potential less than that applied to the plate by a connection extending to a voltage divider including a pair of resistors 158 and 160 which are energized by a filtered B+ power supply 161.

The application of a positive voltage to the control grid of the tube 152 renders this tube conductive so that a current flows through the operating winding 162 of a relay 164, thereby to operate this relay. A condenser 166, shunted across the winding 162, prevents the release of the relay 164 during intermittent current flow through the tube 152. Operation of the relay 164 moves an armature 168 controlled thereby into engagement with a contact 170 to complete the energizing circuit for the solenoid 68 whereby the film projector 40 is actuated to advance another frame of a film into a projecting position in direct response to the sensing of a pulse on the channel 22 by the transducing head 16.

Accordingly, the apparatus 36 which is rendered effective for either recording or playback operations by the control unit 38 and which is operated in its record position by the push button 42, simultaneously operates the film projector 40 and energizes the transducing head 16 to record a pulse on the control channel 22. During playback operation, apparatus 36 interconnects the transducing head 16 with the solenoid 68 through amplifying and detecting means provided by the tubes 78, 92, and 152 so that the film projector 40 is operated in response to the sensing of each control pulse on the channel 22. These functions are accomplished by apparatus 36 with a minimum of circuit components by utilizing a single group of tubes both as a source of control signals which are recorded under the control of the push button 42 and as an amplifying and detecting network operated by the recorded control signals for actuating the film projector 40.

In order to prevent inadvertent erasure of recorded information on the channels 20 and 22 by the erasing heads 14 and 18, the controls 32 and 38 are interlocked with the main control 34 so that these controls can only be turned to and mechanically retained in the record position to render the erase heads effective when the main control 34 is in either the stop position or the forward position. Further, the interlock automatically returns the controls 32 and 38 to the listen and playback positions in which the erasing heads 14 and 18 are rendered ineffective when the main control 34 is moved from any one position to another. Further, either of the controls 32 and 38 may be independently moved to a record position and retained therein by the interlock to permit independent recording operation by one of the apparatuses 30 and 36 without an accompanying erasure of the information on the channel associated with the other apparatus.

Referring now to Fig. 1, the main control 34 includes a cam 170 which, as disclosed in detail in my copending application, is utilized in the control of the speed and direction of movement of the magnetic tape 24. In order to coordinate the positions of the listen-record control 32, which controls the recording of sound on and the reproduction of sound from the intelligence channel 20 with the speed and the direction of movement of the magnetic tape 24 and thus with the main control 34, a mechanical linkage similar to that shown in the copending application is utilized. This linkage includes a lever 172 pivoted to a supporting base member at 174 so that a cam follower 176 secured thereto is held in engagement with the outer periphery of the main control cam 170 by a spring 178. The cam has a plurality of depressions 180, 182, 184, and 186 corresponding, respectively, to the fast forward, forward, stop, and rewind positions of the main control 34. These depressions are dimensioned so that when the cam follower 176 engages the depressions 182 and 184, the spring 178 deflects the lever 172 in a clockwise direction to permit an end of an interlock arm 188 carried by the shaft secured to the knob 50 to be moved beyond and engaged by a free end 172*a* of the lever 172, thereby to maintain the control 32 in its record position. When the cam follower 176 engages the depressions 180 and 186, the lever 172 is held in a counterclockwise deflected position in which the end 172*a* cannot be engaged by the end of the interlock arm 188. Accordingly, the control 32 will not be maintained in a record position by the lever 172 during either the rewind or the fast forward movements.

The control 32 is automatically returned by a spring 189 to a listen position in which the erasing head 14 is ineffective in response to rotation of the main control cam 170 inasmuch as the engagement of the cam follower 176 with the raised portions separating the depressions 180, 182, 184, and 186 deflects the lever 172 in a counterclockwise direction to the position shown in dashed outline in Fig. 1. In this position, the end 172*a* of the lever is moved out of engagement with the free end of the interlock arm 188 thereby permitting the spring 189 to return the control 32 to a normal listen position.

In order to interlock the signal control 38 with both of the controls 32 and 34, there is provided a lever 190 pivoted to a base member at 192 and having an end portion 190*a* which is adapted to be engaged by an end of the lever 172. An intermediate position of the lever 190 is connected to the base member by a tension spring 194 which urges the end 190*a* toward the lever 172. Since the position of the lever 190 is determined by the position of the lever 172 and, consequently, by the position of the main control cam 170, rotation of this cam simultaneously controls the effectiveness of the interlocks provided for the controls 32 and 38.

More particularly, as set forth hereinabove, when the cam 170 is in either the stop or the forward position, the lever 172 is moved to its clockwise deflected position in which the end 172*a* is effective to retain the control 32 in the record position. This clockwise deflection of the lever 172 produces an accompanying counterclockwise deflection of the lever 190, which counterclockwise deflection renders the interlock for the control 38 effective to retain this control in a record position when it is manually turned thereto. Also, when the cam 170 is turned to the rewind or to the fast forward positions, the lever 172 is deflected to its counterclockwise position in which this lever is not effective to retain the control 32 in the record position. This counterclockwise deflection of the lever 172 produces an accompanying clockwise deflection of the lever 190 so that the interlock provided thereby is not effective to retain the control 38 in its record position.

Referring now to the control 38, which controls the control signal transducing heads 16 and 18, this includes an interlock cam 198 which is connected to the shaft to which is also connected the knob 56. The cam 198 includes a shoulder 202 and is resiliently urged to a normal playback position, as shown in dashed outline, by a spring 199. Assuming that the main control 34 is in either the stop or forward positions, the control 38 may be adjusted to and held in a record position in which the apparatus 36 is effective to record control signals on the control channel 22 by rotating the knob 56 and the cam 198 in a clockwise direction against the force of the spring 199 so that a projecting arm 196 on the interlock lever 190 slides over the outer periphery of the cam. Following movement of the arm 196 beyond the shoulder 202, the springs 194 and 199 move these elements into interlocking engagement so as to retain the control 38 in a record position. In the event that the cam 170 is in either the rewind or the fast forward positions, the arm 196 and the lever 190 are held in a clockwise deflected position so that the arm does not move into interlocking engagement with the shoulder 202 and, accordingly, the spring 199 returns the control 38 to a normal playback position following the release of the knob 56. Although the effective position of the interlock lever 190 is controlled by the position of the lever 172, the operation of the control 38 is completely independent of the operation of the control 32 and may be independently adjusted to a playback or record position in dependence upon the position of the main control 34.

The interlock provided by the lever 190 and the cam 198 is released in synchronism with the interlock provided for the control 32 inasmuch as rotation of the main control cam 170 from one of its operative positions to another deflects the lever 172 and, consequently, the lever 190 to the position shown in dashed outline in Fig. 1. In this position, the lever 190 is deflected in a clockwise direction so that the arm 196 is moved out of interlocking engagement with the shoulder 202 thereby permitting the spring 199 to return the control 38 to its normal playback position. Therefore, since both of the controls 32 and 38 are returned to the normal listen and playback positions, respectively, in response to the operation of the main control 34 to any of its operative positions, the erasing heads 14 and 18 are automatically, rendered ineffective to prevent the inadvertent erasure of recorded information when the speed and direction of movement of the magnetic tape 24 is varied.

Accordingly, the present invention provides an auxiliary control circuit forming a part of a unitary self-contained tape recorder apparatus which provides means independently controllable at selected times for simultaneously operating a remote film projector and recording control signals on one channel of a multichannel tape independently of the recording of a continuous sound track on another channel of the tape. The electronic components of the auxiliary circuit in addition to providing a control signal generator operable by a push button to provide recorded control signals on the control channel of the tape are convertible under the control of a control signal record-playback switch to provide an amplifier detector channel whereby the remote projector is operated in timed relation to the reproduction of the continuous sound track in accordance with the previously recorded control signals.

The control signal playback-record switch and the record-listen switch which control the transducing means associated with the separate tape channels are each independently operable to record and listen or playback positions so that the sequence of visual displays provided in accordance with the control signals can be varied without affecting the continuity of the sound track. However, the unitary combined tape recorder and slide projector control apparatus further includes an interlock which prevents the inadvertent erasure of both the sound track and the recorded control signals by providing means for permitting the transducer control switches to be independently turned to and held in a record position in which the erasing means are effective only when the main control which varies the speed and direction of movement of the tape is in either a forward or a stop position. This interlock also simultaneously releases the transducing head control switches in response to any movement of the main control to vary the speed or direction of movement of the magnetic tape.

While the present invention has been described in conjunction with an illustrative embodiment thereof, it should be understood that these details are not intended to be limitative of the invention except insofar as set forth in the accompanying claims.

What is claimed as new and desired to be secured by Letters Patent of the United States is:

1. Transducing apparatus wherein means are provided for propelling a sensible medium having a plurality of effective channels in different directions and at different speeds, comprising first transducing means cooperating with one of said channels, second transducing means cooperating with another of said channels, circuit means including first and second independently actuated switching means each operable to two different settings for independently conditioning said first and second transducing means for recording and reproducing operations, adjustable control means for varying the direction and speed of movement of said sensible medium, and interlock means controlled by said control means and including means for controlling the settings to which said first and second switching means are adjusted, thereby to maintain said first and second transducing means in condition for a predetermined transducing operation.

2. The apparatus set forth in claim 1 in which the interlock means releasably maintain said first and second switching means in settings wherein said first and second transducing means are prepared for recording operations in accordance with the position of said control means.

3. The apparatus set forth in claim 1 in which the interlock means includes means for simultaneously returning said first and second switching means to settings in which said first and second transducing means are conditioned for a reproducing operation in response to adjustment of said control means.

4. The apparatus set forth in claim 1 in which said first and second transducing means each include separate erasing means and in which said interlock means controls said first and second switching means to maintain the energization of said erasing means only when said sensible medium is being moved in a predetermined manner.

5. A combined sound recorder and visual display device comprising a display operating unit for actuating said visual display device to provide a visual display; transducing means for performing transducing operations on a sensible medium; circuit means including electronic means for operating said transducing means and said display operating unit, said electronic means having one condition in which it generates a signal which is recorded on said medium by said transducing means and a second condition in which said electronic means receives a signal reproduced from said medium by said transducing means to operate said display unit; and means for alternatively adjusting said circuit means to the signal generating condition and to the display unit operating condition.

6. A combined slide projector and tape recorder utilizing a sensible medium having a plurality of effective channels; comprising first transducing means for recording sound on or reproducing sound from one of said channels; second transducing means disposed adjacent another of said channels; electronic circuit means including switching means adjustable to at least two different positions for connecting said circuit to said second transducing means, one position of said switching means causing said circuit to supply a control signal to said second transducing means for recording on said sensible medium, another position of said switching means causing said circuit to be energized by control signals previously recorded on said sensible medium to provide an output signal; and projector controlling means connected to said electronic circuit so as to be energized by said output signal whereby the projector controlling means is operated in accordance with said recorded control signals to change the visual display provided by said projector.

7. The apparatus defined by claim 6 in which the switching means includes a push button which is operable to convert said electronic circuit into an oscillator for generating control signals and which converts said electronic circuit to an amplifier when released.

8. A combined slide projector and tape recorder utilizing a sensible medium; comprising selector means adjustable to settings including a forward setting for selectively providing forward movement of said medium; first transducing means positioned adjacent the path of movement of said medium; first control means operable to a first state for conditioning said first transducing means to record signals on said medium and operable to a second state for conditioning said first transducing means to reproduce signals from said medium; second transducing means positioned adjacent the path of movement of the medium; second control means for conditioning said second transducing means for recording control signals on or reproducing control signals from the medium; said first and second control means being independently adjustable to positions in which the associated transducing means are conditioned for recording operations; and interlock means controlled by said selector means in the forward movement setting thereof for releasably holding said first and second control means in a record position, said interlock means releasing said first and second control means in response to operation of said selector means.

9. The apparatus set forth in claim 8 in which the first and the second control means each include switching means which are normally biased to a position in which the first and second transducing means are conditioned to reproduce signals previously recorded on the medium.

10. Transducing apparatus utilizing a sensible medium having a plurality of effective channels comprising first transducing means for recording sound on or reproducing sound from one of said channels; second transducing means disposed adjacent another of said channels; electronic circuit means including switching means adjustable to at least two different positions for connecting said circuit to said second transducing means, one position of said switching means causing said circuit to supply a control signal to said second transducing means for recording on the medium, another position of said switching means causing said circuit to be energized by said recorded control signals to provide an output signal; and relay means connected to said electronic circuit so as to be energized by said output signal whereby said relay means is operated at time spaced intervals by the control signals on said other channel.

11. A combined slide projector and tape recorder utilizing a sensible medium; comprising selector means adjustable to settings including a forward setting for selectively providing forward movement of said medium; first transducing means positioned adjacent the path of movement of said medium; first control means operable to a record position for conditioning said first transducing means to record signals on said medium and operable to a reproduce position to condition said first transducing means to reproduce signals from said medium; second transducing means positioned adjacent the path of movement of the medium; second control means operable to a record position for conditioning said second transducing means to record control signals on said medium and operable to a reproduce position for conditioning said second transducing means to reproduce control signals from the medium; said first and second control means being independently adjustable to said record positions in which the associated transducing means are conditioned for recording operations; interlock means controlled by said selector means in the forward movement setting thereof for releasably holding said first and second control means in a record position, said interlock means releasing said first and second control means in response to operation of said selector means; and projector operating means effectively connected to said second transducing means by the release of said second control means under the control of said interlock means whereby said projector operating means is rendered responsive to said control signals.

12. In combination with an optical projector, an intermittently operable film feeding mechanism for said projector, first circuit means connected to said feeding mechanism for operating said mechanism, a transducing head disposed adjacent a sensible medium, second circuit means connected to said transducing head for controlling the recording of a signal on said medium by said transducing head, and means connected to said first and second circuit means for selectively operating said feeding mechanism and for automatically energizing said transducing head to record a signal on said medium for each operation of said feeding mechanism.

13. In combination with a controlled device and a sound reproducing system using a magnetic medium; a transducing head for performing transducing operations on said medium; an electronic circuit having input means and output means and including at least one electronic device; and switching means for selectively conditioning said transducing head for recording signals on or reproducing recorded signals from said magnetic medium, said switching means being operable to a recording position to connect the output means of said electronic circuit to said transducing head and to connect said electronic device in said electronic circuit to provide a phase shift oscillator for generating control signals for application to said transducing head, said switching means also being operable to a reproducing position to connect said transducing head to the input means of said electronic circuit and to connect said electronic device in said circuit to provide an amplifier for amplifying the control signals reproduced by said transducing head, thereby to provide signals for operating said controlled device.

14. The system set forth in claim 13 including a second electronic device to which the amplified control signals are applied by said one electronic device, and a relay connected to said second electronic device and operated by said second electronic device to actuate said controlled device when amplified control signals are supplied by said one electronic device.

15. The system set forth in claim 14 in which a network including a rectifier and a condenser is connected to said second electronic device to convert said amplified control signals from said one electronic device to a relatively steady state signal for operating said second electronic device.

16. An apparatus for controlling visual and audible reproducing means comprising visual reproducing means, recording means for recording both control and intelligence signals on a sensible medium, first means connected to said recording means and continuously operative to record intelligence signals on said medium, second means connected to said recording means for periodically recording control signals on said medium, a control circuit connected to said visual reproducing means and to said second means, and periodically operable means in said control circuit for concurrently operating said visual reproducing means and said second means at time spaced intervals so that said second means operates said recording means to record a control signal on said medium for each actuation of said visual reproducing means and diving the continuous recording of intelligence signals.

17. A combined sound recorder and visual display device comprising a display operating means, transducing means for performing transducing operations on a sensible medium, circuit means including switching means for operating said transducing means to record said signals on said medium and for actuating said display operating means, and means for rendering said transducing means effective to reproduce the signals recorded on said medium and for rendering said circuit means responsive to the signals reproduced from said medium by said transducing means for actuating said display operating means.

References Cited in the file of this patent

UNITED STATES PATENTS

| | | |
|---|---|---|
| 2,206,192 | Johnson | July 2, 1940 |
| 2,221,312 | Jenkins et al. | Nov. 12, 1940 |
| 2,475,439 | Waller et al. | July 5, 1949 |
| 2,503,083 | Waller | Apr. 4, 1950 |
| 2,514,578 | Heller et al. | July 11, 1950 |
| 2,529,097 | Mullin | Nov. 7, 1950 |
| 2,540,299 | Shoup et al. | Feb. 6, 1951 |
| 2,558,853 | Kappeler | July 3, 1951 |
| 2,631,855 | Kornei | Mar. 17, 1953 |
| 2,654,003 | Dashiell | Sept. 29, 1953 |
| 2,675,430 | Clarke | Apr. 13, 1954 |
| 2,693,127 | Ortman | Nov. 2, 1954 |
| 2,697,754 | Ranger | Dec. 21, 1954 |
| 2,777,901 | Dostert | Jan. 15, 1957 |
| 2,811,588 | Julie | Oct. 29, 1957 |

UNITED STATES PATENT OFFICE

CERTIFICATE OF CORRECTION

Patent No. 2,975,672 March 21, 1961

George B. Shields

It is hereby certified that error appears in the above numbered patent requiring correction and that the said Letters Patent should read as corrected below.

Column 11, line 9, strike out "said", second occurrence.

Signed and sealed this 27th day of April 1965.

(SEAL)
Attest:

ERNEST W. SWIDER
Attesting Officer

EDWARD J. BRENNER
Commissioner of Patents